United States Patent
Yoshida et al.

(10) Patent No.: US 9,417,617 B2
(45) Date of Patent: Aug. 16, 2016

(54) CONTROL APPARATUS AND SHIFT-BY-WIRE SYSTEM HAVING THE SAME

(71) Applicant: DENSO CORPORATION, Kariya, Aichi-pref. (JP)

(72) Inventors: Kazuhiro Yoshida, Tokoname (JP); Haruki Matsuzaki, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/559,175

(22) Filed: Dec. 3, 2014

(65) Prior Publication Data
US 2015/0160639 A1    Jun. 11, 2015

(30) Foreign Application Priority Data

Dec. 6, 2013  (JP) ................................ 2013-253034

(51) Int. Cl.
| | |
|---|---|
| *G05B 11/01* | (2006.01) |
| *G05B 19/048* | (2006.01) |
| *F16H 61/12* | (2010.01) |
| *F16H 61/32* | (2006.01) |
| *G06N 99/00* | (2010.01) |

(52) U.S. Cl.
CPC .............. *G05B 19/048* (2013.01); *F16H 61/12* (2013.01); *F16H 61/32* (2013.01); *H02P 29/0241* (2016.02); *H02P 29/032* (2016.02); *F16H 2061/1208* (2013.01); *F16H 2061/1216* (2013.01); *G06N 99/005* (2013.01)

(58) Field of Classification Search
CPC .............. G06N 99/005; B60L 11/1805; B60L 11/1861; B60L 15/2045; B60L 2250/26; B60L 2260/30; B60L 7/003; B60L 7/12; F16H 2061/1208; F16H 2061/1216; F16H 61/12; F16H 61/32; G05B 13/0265; G05B 19/048
USPC ............ 318/635, 245, 254.1, 400.02, 400.32, 318/430–434, 139
See application file for complete search history.

(56) References Cited

U.S. PATENT DOCUMENTS 5,371,645 A * 12/1994 Mochizuki ........... H02H 7/0833
361/22
7,053,581 B2 * 5/2006 Chen ................... B60L 11/1803
318/432

(Continued)

OTHER PUBLICATIONS

Yoshida, U.S. Appl. No. 14/559,284, filed Dec. 3, 2014.

(Continued)

*Primary Examiner* — Paul Ip
(74) *Attorney, Agent, or Firm* — Nixon & Vanderhye PC

(57) ABSTRACT

A control apparatus controlling a motor for driving an object includes: switching devices in multiple phases, each of which allows and interrupts energization to a corresponding winding of the motor; a controller for the switching devices; a current detecting circuit for a current flowing through each winding and each switching device; a current limit circuit limiting the current to match to a current limiting value; a standard position learning device learning a standard position of the motor such that the current limit circuit limits the current, and the motor rotates until the object stops at a limit position of a movable range; a rotation angle change amount detecting device detecting a change amount of a rotation angle of the object; and an error determination device determining that the current detecting circuit malfunctions when the change amount is out of a predetermined range, and the object changes between first and second states.

6 Claims, 6 Drawing Sheets

(56) References Cited

U.S. PATENT DOCUMENTS

| | | | | |
|---|---|---|---|---|
| 7,106,017 B2* | 9/2006 | Kifuku | H02H 7/0833 | 318/400.02 |
| 7,650,760 B2* | 1/2010 | Nakata | H02P 6/06 | 318/722 |
| 8,207,694 B2* | 6/2012 | Izumi | B60K 6/48 | 318/400.01 |
| 8,288,979 B2* | 10/2012 | Bates | H02P 1/04 | 310/184 |
| 8,381,869 B2* | 2/2013 | Fujimoto | B62D 5/046 | 180/443 |
| 8,541,965 B2* | 9/2013 | Ueda | B62D 5/046 | 318/400.02 |
| 2002/0109474 A1* | 8/2002 | Kifuku | H02H 7/0833 | 318/434 |
| 2005/0285556 A1* | 12/2005 | Chen | B60L 11/1803 | 318/432 |
| 2006/0179859 A1* | 8/2006 | Nakata | H02P 6/06 | 62/228.1 |
| 2006/0207373 A1 | 9/2006 | Amamiya et al. | | |
| 2008/0047776 A1* | 2/2008 | Kobayashi | B62D 5/046 | 180/446 |
| 2010/0052581 A1* | 3/2010 | Izumi | B60K 6/48 | 318/400.04 |
| 2010/0066293 A1* | 3/2010 | Iriguchi | F02N 11/08 | 318/478 |
| 2010/0253140 A1* | 10/2010 | Yamashita | B62D 5/0457 | 307/9.1 |
| 2011/0025238 A1* | 2/2011 | Ueda | B62D 5/046 | 318/400.02 |
| 2011/0272205 A1* | 11/2011 | Fujimoto | B62D 5/046 | 180/446 |
| 2013/0076290 A1* | 3/2013 | Yoshida | G01D 5/24476 | 318/652 |
| 2013/0200826 A1* | 8/2013 | Yoshida | H02P 6/205 | 318/400.11 |
| 2013/0229136 A1* | 9/2013 | Bates | H02P 25/18 | 318/400.41 |

OTHER PUBLICATIONS

Yoshida, U.S. Appl. No. 14/559,144, filed Dec. 3, 2014.

* cited by examiner ing control is improved even if the condition is changed. However, when the system includes a physical circuit for detecting the sum of the current flowing through each phase of the winding of the motor, if the circuit is damaged, the standard position may not be learned properly.

(Patent document No. 1) JP-2004-308752-A corresponding to US 2006/0207373 A1

CONTROL APPARATUS AND SHIFT-BY-WIRE SYSTEM HAVING THE SAME

CROSS REFERENCE TO RELATED APPLICATION

This application is based on Japanese Patent Application No. 2013-253034 filed on Dec. 6, 2013, the disclosure of which is incorporated herein by reference.

TECHNICAL FIELD

The present disclosure relates to a control apparatus for controlling an operation of a motor and a shift-by-wire system having the same.

BACKGROUND

Conventionally, in a vehicular control technique, a by-wire system for electrically controlling an actuator of changing a vehicle state with a by-wire control circuit according to an instruction from a driver of a vehicle is well known. For example, Patent document No. 1 teaches a shift-by-wire system for switching a shift lever according to an instruction of the driver. In the system, the operation of the actuator having a brushless motor is controlled so that the shift range is changed by rotatably driving a detent plate in a shift range switching device.

In the shift-by-wire system according to Patent document No. 1, based on a counting value of a pulse signal output from an encoder at every predetermined angle in synchronization with a rotation of the motor, the shift range is switched to a target range by rotating the motor to reach a target rotation position, which corresponds to the target range. Further, in the shift-by-wire system according to Patent document No. 1, before starting a switching control of the shift range, i.e., before starting a normal driving control of the motor, the system rotates the motor until the detent plate stops at a limitation position in a movable range so that a standard position learning control for learning a standard position of the motor is performed. When the system learns the standard position, the limitation position coincides with the standard position of the motor. Thus, after that, the system can perform the normal driving control for rotating the motor toward the target rotation position.

Here, when the standard position learning control is executed in a system for controlling a current flowing through each phase of the motor according to a duty ratio corresponding to a voltage, even if the voltage is same, the current flowing through each phase of a winding of the motor may change according to a change of a winding resistance caused by temperature change and/or chronological change, so that the torque of the motor is changed. Thus, the accuracy of the standard position learning control may be reduced. This view point is not considered in the system according to Patent document No. 1. Thus, in the system according to Patent document No. 1, the accuracy of the standard position learning control may be reduced according to the condition change such as the temperature change or the chronological change.

When the standard position learning control is performed, the current flowing through the windings is limited so as to reach the sum of current flowing through each phase of the winding of the motor to be a predetermined current limitation value. Thus, the change of the current in each phase caused by the temperature change or the chronological change is restricted, so that the accuracy of the standard position learn-

SUMMARY

It is an object of the present disclosure to provide a control apparatus detecting an operation error of the circuit relating to the standard position learning and having high accuracy of the standard position learning control. It is another object of the present disclosure to provide a shift-by-wire system having a control apparatus.

According to a first aspect of the present disclosure, a control apparatus that controls a motor, which has a plurality of windings respectively corresponding to a plurality of phases, and is supplied an electric power from a power source so that the motor rotates, for rotating and driving an object, the control apparatus includes: a plurality of switching devices, each of which corresponds to one of the plurality of phases, allows energization to a corresponding winding when the switching device turns on, and interrupts the energization to the corresponding winding when the switching device turns off; a controller that controls the switching devices to turn on and off so that the controller controls an operation of the motor; a current detecting circuit that detects a current flowing through each winding and each switching device; a current limit circuit that limits the current flowing through each winding and each switching device to match the current to one of two or more current limiting values; a standard position learning device that learns a standard position of the motor in such a manner that the current limit circuit limits the current flowing through each winding and each switching device, and the controller controls the motor to rotate until the object stops at a limit position of a movable range; a rotation angle change amount detecting device that detects a change amount of a rotation angle of the object; and an error determination device that determines whether the current detecting circuit malfunctions. A first state is defined as a state that the current limit circuit limits the current flowing through each winding and each switching device to match the current to a first current limit value, and the object stops at the limit position of the movable range. A second state is defined as a state that the current limit circuit limits the current flowing through each winding and each switching device to match the current to a second current limit value, and the object stops at the limit position of the movable range. The error determination device determines that the current detecting circuit malfunctions under a condition that the change amount detected by the rotation angle change amount detecting device is out of a predetermined range when the object changes from one of the first state and the second state to the other of the first state and the second state.

In the above apparatus, when the standard position of the motor is learned, the current flowing through the windings and the switching devices is restricted by the current limiting circuit based on the current detected by the current detecting circuit, and the motor is rotated and driven. Thus, a change of the current in each phase caused by temperature change and/or chronological change is restricted, and the change of a torque of the motor is restricted. Accordingly, the learning accuracy of the standard position is improved notwithstanding a change of a condition such as the temperature change and the chronological change.

Further, a torsion amount of an output shaft or a shaft connecting to the output shaft in the motor in the first state is different from the second state. Thus, an error of the current detecting circuit is detectable using a feature such that the rotation angle of the object is changed when the object changes between the first state and the second state. Thus, the standard position is not learned under a condition that the current detecting circuit malfunctions. Accordingly, the apparatus avoids the malfunction and/or loss of control of the motor caused by an erroneously learned standard position.

According to a second aspect of the present disclosure, a shift-by-wire system includes: a control apparatus; a motor controlled by the control apparatus; and an object rotated and driven by the motor. The object has a shift range, which is switchable by an operation of the motor. The motor has a plurality of windings respectively corresponding to a plurality of phases, and is supplied an electric power from a power source so that the motor rotates. The control apparatus includes: a plurality of switching devices, each of which corresponds to one of the plurality of phases, allows energization to a corresponding winding when the switching device turns on, and interrupts the energization to the corresponding winding when the switching device turns off; a controller that controls the switching devices to turn on and off so that the controller controls an operation of the motor; a current detecting circuit that detects a current flowing through each winding and each switching device; a current limit circuit that limits the current flowing through each winding and each switching device to match the current to one of two or more current limiting values; a standard position learning device that learns a standard position of the motor in such a manner that the current limit circuit limits the current flowing through each winding and each switching device, and the controller controls the motor to rotate until the object stops at a limit position of a movable range; a rotation angle change amount detecting device that detects a change amount of a rotation angle of the object; and an error determination device that determines whether the current detecting circuit malfunctions. A first state is defined as a state that the current limit circuit limits the current flowing through each winding and each switching device to match the current to a first current limit value, and the object stops at the limit position of the movable range. A second state is defined as a state that the current limit circuit limits the current flowing through each winding and each switching device to match the current to a second current limit value, and the object stops at the limit position of the movable range. The error determination device determines that the current detecting circuit malfunctions under a condition that the change amount detected by the rotation angle change amount detecting device is out of a predetermined range when the object changes from one of the first state and the second state to the other of the first state and the second state.

In the above system, a change of the current in each phase caused by temperature change and/or chronological change is restricted, and the change of a torque of the motor is restricted. Accordingly, the learning accuracy of the standard position is improved notwithstanding a change of a condition such as the temperature change and the chronological change. Further, an error of the current detecting circuit is detectable using a feature such that the rotation angle of the object is changed when the object changes between the first state and the second state. Thus, the standard position is not learned under a condition that the current detecting circuit malfunctions. Accordingly, the system avoids the malfunction and/or loss of control of the motor caused by an erroneously learned standard position.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be explained with reference to drawings.

Embodiments

Figure 1:
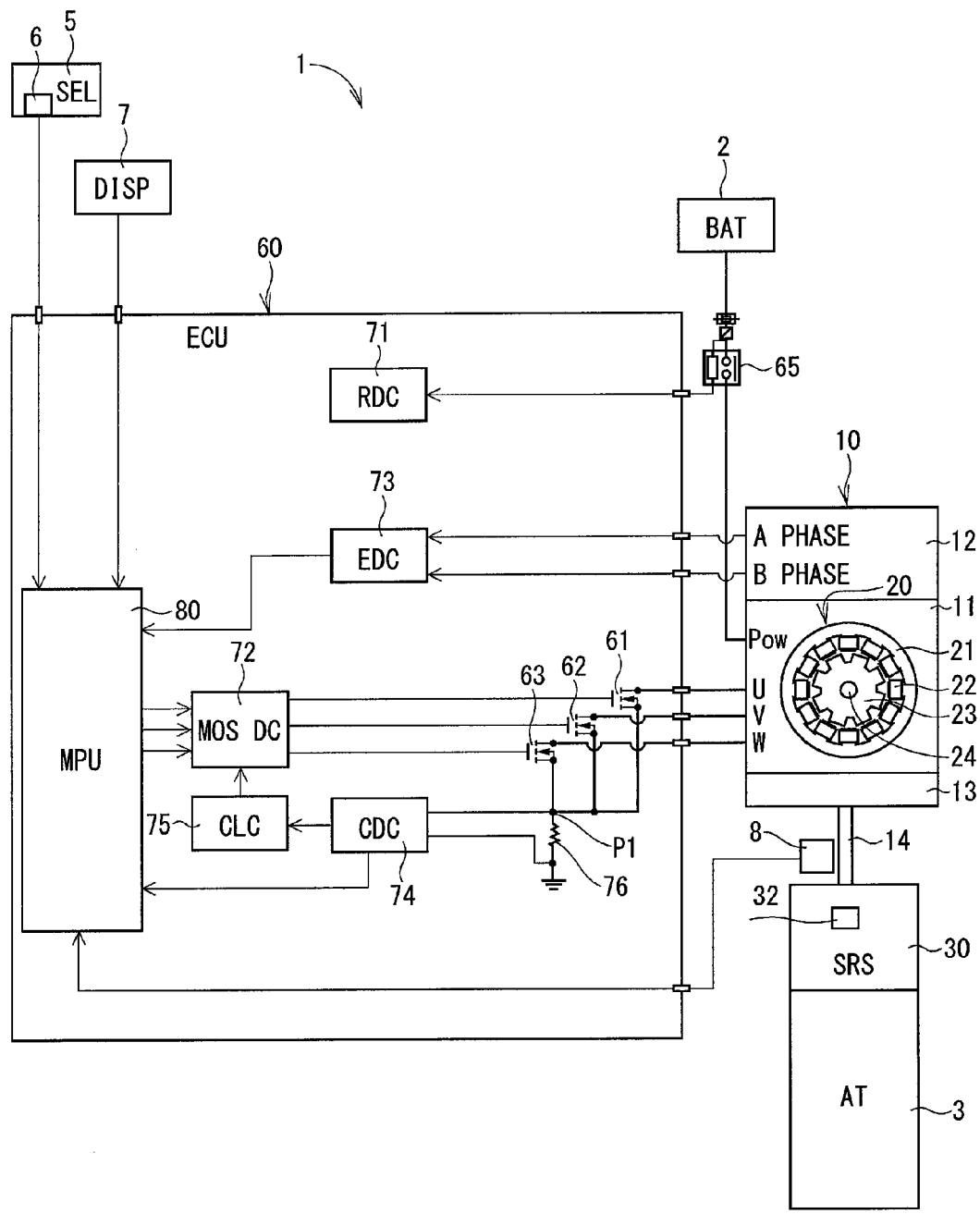
FIG. 1 is a diagram showing a shift-by-wire system having an electric control unit according to an example embodiment of the present disclosure.

An electronic control unit (i.e., ECU) 60 as a control apparatus according to the present example embodiment and a shift-by-wire system 1 having the ECU are shown in FIG. 1. The shift-by-wire system 1 includes an actuator 10, a shift range switching device 30, the ECU 60, and the like. The system 1 is mounted on a vehicle together with an automatic transmission 3, for example. The system 1 drives the actuator 10 and the shift range switching device 30 according to an instruction of a driver of the vehicle, so that the shift range of the automatic transmission 3 is switched by the by-wire control.

The actuator 10 includes a housing 11, a motor 20, an encoder 12, a reducer 13, and an output shaft 14.

In the present example embodiment, the motor 20 is, for example, a switched reluctance motor (i.e., SR motor), which is a three-phase driving type brushless motor for generating a driving force without using a permanent magnet. The motor 20 includes a stator 21, a winding 22, a rotor 23 and a motor shaft 24.

The stator 21 is fixed in the housing 11. Multiple windings 22 are arranged to wind around a protrusion pole of the stator 21. Each winding 22 corresponds to one of three phases of the motor (i.e., one of a U phase, a V phase and a W phase). The rotor 23 is rotatably arranged in the stator 21. The rotor 23 includes multiple protrusions, which protrude toward a radially outside direction and are arranged along a circumference at equal intervals. The motor shaft 24 is integrated with the rotor 23, and the shaft 24 is rotatably supported by the housing 11.

When the energization to the winding 22 of each phase in the motor 20 is switched sequentially, the rotation magnetic field is generated at the stator 21, so that the rotor 23 rotates.

Thus, the motor 20 rotates when the electric power is supplied from a battery 2 as a power source of the vehicle. The ECU 60 controls the driving operation of the motor 20 by switching the energization to the winding 22 of each phase supplied from the battery 2.

The encoder 12 includes a magnet integrally rotatable with the rotor 23, and a magnetic field detection Hall IC mounted on a substrate, which is fixed to the housing 11. The Hall IC is opposed to the magnet, and detects that a magnetic flux generating unit passes through the Hall IC. In the present embodiment, the encoder 12 is an incremental type element so that the encoder 12 outputs a pulse signal in a A phase and a pulse signal in a B phase according to a change of a rotation angle of the motor 20 (i.e., the rotor 23).

The reducer 13 reduces the rotation motion, i.e., rotation speed of the motor shaft 24 in the motor 20, and then, outputs the reduced rotation motion via the output shaft 14. Thus, the reducer 13 transmits the rotation motion to the shift range switching device 30. The shift range switching device 30 transmits the rotation driving force, which is transmitted from the reducer 13, to a manual valve 4 and a parking lock mechanism 50, as shown in FIG. 2.

Figure 2:
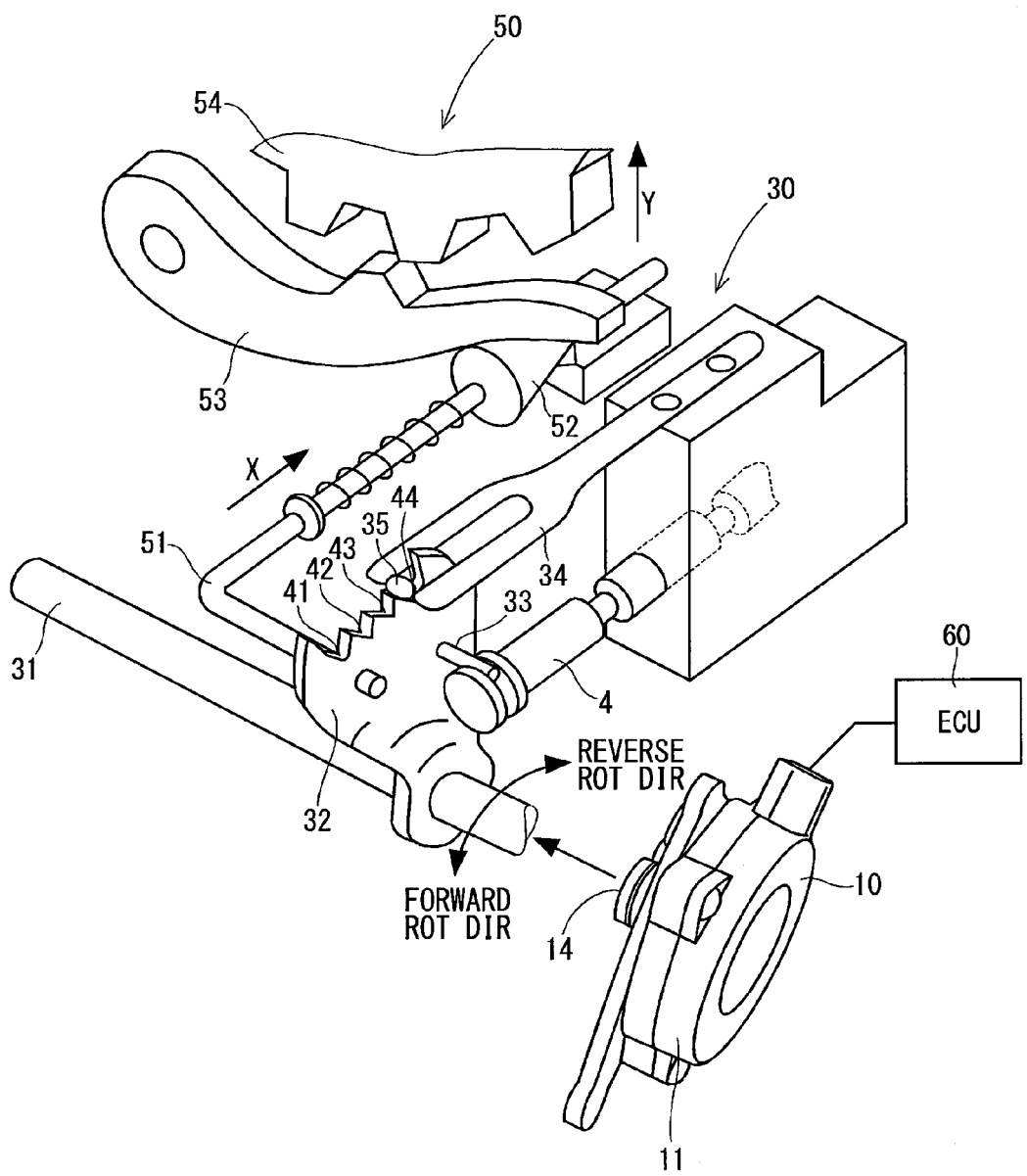
FIG. 2 is a diagram showing a perspective view of a shift range switching device in FIG. 1.

As shown in FIG. 2, the shift range switching device 30 includes a manual shaft 31, a detent plate 32 and a detent spring 34.

The manual shaft 31 is connected to the output shaft 14 of the actuator 10. The shaft 31 is driven and rotated by a rotation driving force of the motor 20. The detent plate 32 protrudes from the manual shaft 31 toward the radially outside direction. The detent plate 32 is fixed to the manual shaft 31. The detent plate 32 corresponds to a driven object.

A pin 33 is formed on the detent plate 32, and the pin 33 protrudes toward a direction in parallel to the manual shaft 31. The pin 33 is engageable with an end of the manual valve 4 along the axial direction of the manual valve 4. Accordingly, when the detent plate 32 rotates together with the manual shaft 31, the manual valve 4 moves along the axial direction. Specifically, the shift range switching device 30 converts the rotation motion of the actuator 10 to be a linear motion, and then, transmits the linear motion to the manual valve 4.

The detent plate 32 includes concavities 41-44 on an outer periphery thereof. The concavity 41 is formed on the detent plate 32 on one end in the rotation direction. The concavity 44 is formed on the detent plate 32 on the other end in the rotation direction. The concavities 42, 43 are formed between the concavities 41, 44. In the present embodiment, the concavity 41 corresponds to a P range (i.e., parking range) of the shift range in the automatic transmission 3. The concavity 42 corresponds to a R range (i.e., reverse range). The concavity 43 corresponds to a N range (i.e., neutral range) of the shift range in the automatic transmission 3. The concavity 44 corresponds to a D range (i.e., drive range).

The detent spring 34 has a plate shape, which is elastically deformable. The detent spring 34 has a detent roller 35 on a top end of the spring 34 as a limiter. The detent spring 34 pushes the detent roller 35 toward a rotation center of the detent plate 32 (corresponds to the center of the manual shaft 31). When a rotation force equal to or larger than a predetermined value is applied to the detent plate 32, the detent spring 34 is elastically deformed so as to bend, and the detent roller 35 hops over one of convexities formed among the concavities 41-44 and moves to a next concavity 41-44, which is adjacent to a current concavity 41-44. Accordingly, when the actuator 10 rotates the manual shaft 31, the position of the manual valve 4 in the axial direction and the state of the parking lock mechanism 50 are changed, so that the shift range of the automatic transmission 3 is changed.

When the detent roller 35 is engaged with one of the concavities 41-44, the rotation of the detent plate 32 is limited. Thus, the position of the manual valve 4 in the axial direction and the state of the parking lock mechanism 50 are defined. Further, the shift range of the automatic transmission 3 is fixed. Thus, the detent plate 32 and the detent roller 35 function as a detent mechanism.

In the present embodiment, when the shift range is switched from the P range to the R range, the N range or the D range, the rotating direction of the output shaft 14 in the actuator 10 is defined as the forward rotation direction. On the other hand, when the shift range is switched from the D range to the N range, the R range, or the P range, the rotating direction of the output shaft 14 in the actuator 10 is defined as the reverse rotation direction.

FIG. 2 shows a state of the parking lock mechanism 50 when the shift range is the D range, i.e., when the shift range is not the P range. In this case, the parking gear 54 is not locked by the parking lock pole 53. Accordingly, the rotation of the automatic transmission 3 is not prevented. When the output shaft 14 of the actuator 10 rotates in the reverse rotation direction from this state, the rod 51 is pushed toward a X direction in FIG. 2 via the detent plate 32. Further, the taper portion 52 arranged on the top end of the rod 51 is pushed up in a Y direction in FIG. 2. Thus, the parking lock pole 53 is engaged with the parking gear 54, so that the parking gear 54 is locked. As a result, the rotation of the automatic transmission 3 is limited. In this case, the detent roller 35 of the detent spring 34 is engaged with the concavity 41 of the detent plate 32 (i.e., the detent roller 35 is disposed at the center of the concavity 41). The actual range of the automatic transmission 3 (which is defined as an actual range) is the P range.

Next, the detail of the ECU 60 will be explained as follows.

As shown in FIG. 1, the ECU 60 is a small computer having a MPU 80 as a calculation device, a RAM and a ROM as a memory device, various circuits and input/output device. The ECU 60 controls various devices and elements according to various programs stored in the Rom based on data stored in the RAM and the ROM and signals input from various sensors mounted on the vehicle. The ECU 60 is electrically coupled with the battery 2 as a power source of the vehicle. The ECU 60 is energized by the electricity supplied from the battery 2.

Specifically, the ECU 60 includes a relay 65, MOS transistors 61-63, a relay drive circuit 71, a MOS drive circuit 72, an encoder detecting circuit 73, a current detecting circuit 74, a current limiting circuit 75 and a MPU 80.

The relay 65 is arranged between the battery 2 and the motor 20. The relay 65 allows supplying the electricity from the battery 2 to the motor 20 when the relay 65 turns on. When the relay 65 turns off, the electric power supply from the battery 2 to the motor 20 is interrupted.

The relay driving circuit 71 is coupled with the relay 65. The relay driving circuit 71 outputs an on-state signal to the relay 65 so that the circuit 71 controls the relay 65 to turn on. The circuit 71 stops outputting the on-state signal so that the circuit 71 controls the relay 65 to turn off.

The MOS transistors 61-63 are switching elements such as a MOS-FET. Three MOS transistors 61-63 are arranged so as to correspond to three phases of the windings 22 in the motor 20. The drain terminal of the MOS transistor 61 is connected to the winding 22 in the U phase, the drain terminal of the MOS transistor 62 is connected to the winding 22 in the V phase, and the drain terminal of the MOS transistor 63 is connected to the winding 22 in the W phase. The source terminal of each MOS transistor 61-63 is connected to each other at a merging point P1. The merging point P1 is connected to a ground, i.e., a low potential side of the battery 2, via the resistor 76.

The MOS driving circuit 72 is connected to the gate terminal of each MOS transistor 61-63. The MOS driving circuit 72 outputs the on-state signal (i.e., a driving signal) to the gate terminal of each MOS transistor 61-63, so that the circuit 72 turns on the MOS transistor 61-63. Further, the circuit 72 stops outputting the on-state signal, so that the circuit 72 turns off the transistor 61-63.

The encoder detecting circuit 73 is connected to the encoder 12. The encoder detecting circuit 73 detects the pulse signal in the A phase and the pulse signal in the B phase, which output from the encoder 12 according to the change amount of the rotation angle of the motor 20 (i.e., the rotor 23). The pulse signal is output to the MPU 80. The current detecting circuit 74 is connected to the merging point P1, at which the current flowing through the windings 22 and the MOS transistors 61-63 merges. Thus, the circuit 74 detects the current flowing through the merging point P1. A signal indicative of the current flowing through the merging point P1 is output to the current limiting circuit 75 and the MPU 80.

The current limiting circuit 75 is connected to the current detecting circuit 74 and the MOS driving circuit 72. The current limiting circuit 75 controls the MOS driving circuit 72 to match the current detected by the current detecting circuit 74 to one of the first current limit value and the second current limit value selectively. Thus, the circuit 75 limits the current flowing through the windings 22 and the MOS transistors 61-63.

The MPU 80 is a semiconductor chip for executing various calculations. The MPU 80 includes a relay control element, a MOS control element, a rotation detecting element, an initial driving element, a target range setting element, a normal driving element, a standard position learning element, an actual range detecting element, a rotation angle change amount detecting element, and an error determining element, which are functional devices.

The relay control element controls the relay driving circuit 71 so that the relay control element controls the relay 65 to turn on and off.

The MOS control element calculates the driving signal with respect to the MOS transistors 61-63. The MOS control element controls the MOS driving circuit 72 to output the calculated signal from the MOS driving circuit 72, so that the MOS control element controls the MOS transistors 61-63 to turn on and off. When the relay 65 is in the on-state, and the MOS transistor 61 is controlled to turn on, the current flows through the winding in the U phase. When the MOS transistor 62 is controlled to be in the on-state, the current flows through the winding 22 in the V phase. When the MOS transistor 63 is controlled to be in the on-state, the current flows through the winding 22 in the W phase.

The MPU 80 and the MOS driving circuit 72 control the MOS transistors 61-63 to turn on and off, so that the MPU 80 and the circuit 72 control the driving operation of the motor 20. The MPU 80 and the MOS driving circuit 72 correspond to a control apparatus.

The rotation detecting element reduces (i.e., counts down) or increases (i.e., counts up) a counting value (i.e., a counting value of the pulse signal) according to the pulse signal output from the encoder 12. Thus, the rotation detecting element detects the rotation state of the motor 20 (i.e., the rotor 23). Thus, the motor 20 is driven at high rotating speed without deviating from a proper operation.

The initial driving element executes an initial driving control operation for learning a magnetizing and energizing phase of the motor 20 at every time when the power source of the vehicle turns on. Specifically, the initial driving element executes the initial driving control operation for synchronizing the counting value according to the pulse signal output from the encoder 12 with the energizing phase at every time of the activation of the shift-by-wire system 1. In the initial driving control operation, the rotation of the actuator 10 is appropriately controlled.

The selector sensor 6 detects the shift range, which is instructed by the driver of the vehicle using the selector 5, and defined as an instructed shift range. A signal indicative of the instructed shift range is output to the MPU 80.

The target range setting element sets the target range based on the signal indicative of the instructed shift range output from the selector sensor 6. In the embodiment, the target range is set according to the signal of the selector sensor 6, the signal of the brake, and the signal of the vehicle speed sensor and the like.

The normal driving element detects the rotation position of the rotor 23 with respect to the stator 21 according to the pulse signal counting value. The normal driving element outputs an instruction to the MOS controlling element so that the energizing phase of the winding 22 in the motor 20 is switched sequentially. Thus, the normal driving element rotates and drives the rotor 23 toward the target rotation position, and the shift range of the automatic transmission 3 is switched to the target range. The normal driving element executes this normal driving control operation so that the actual range of the automatic transmission 3 is switched to the instructed shift range, which is required by the driver.

Here, since the encoder 12 in the present embodiment is an incremental type encoder, the encoder 12 detects only a relative rotation position of the motor 20 (i.e., the rotor 23). Accordingly, when the motor 20 is rotated and the shift range is switched to the required shift range, it is necessary to learn a standard position corresponding to the absolute position of the motor 20 and to match the limit position of the movable range (i.e., the rotatable range) of the detent plate 32 to the standard position. After learning the standard position of the motor 20, the rotation position of the motor 20 corresponding to the required shift range is calculated according to the standard position and the predetermined rotation amount (i.e., a control constant). The motor 20 is rotated so as to be at the calculated rotation position, so that the actual range is switched to the required shift range.

The standard position learning element executes the standard position learning control operation for learning the standard position of the motor 20 by rotating the motor until the detent plate 32 stops at the limit position of the movable range. In the present embodiment, the limit position of the movable range is disposed at the position corresponding to the P range. Further, the standard position learning element outputs an instruction to the MOS controlling element in order to rotate the motor 20 (i.e., rotor 23) with a two-phase energizing method such that two phases among three phases of the windings 22 are energized, and the energizing phases are switched in turn. Further, the standard position learning element learns the standard position based on the counting value of the pulse signal from the encoder 12 after a predetermined stand-by time has elapsed since the motor 20 stops rotating. When the standard position learning control operation is executed, the motor 20 is rotated until the detent roller 35 hits on the wall of the concavity 41 corresponding to the P range. Thus, the standard position learning control operation is defined as a hitting-wall learning control operation or a contact learning control operation.

The actual range detecting element detects indirectly the actual range by calculating the accrual range based on the standard position, the predetermined rotation amount, and the counting value of the pulse signal from the encoder 12, which is equal to the rotation position of the motor 20, after executing the standard position learning control operation. In the present embodiment, the actual range detecting element detects the actual range based on the rotation position of the motor 20 when the center of the detent roller 35 is positioned in a range of one of the concavities 41-44, which correspond to the P range, the R range, the N range and the D range of the detent plate 32.

Here, when the standard position learning control operation is performed, and the current flowing through each phase of the winding 22 of the motor 20 is controlled with a duty ratio corresponding to the voltage, the learning accuracy of the standard position may be reduced since the torque of the motor 20 is changed according to a change of the current flowing through each phase of the winding 22 in the motor 20 caused by the change of the winding resistance such as temperature change or chronological change even if the voltage is same.

Thus, the standard position learning element limits the current flowing through the windings 22 and the MOS transistors 61-63 using the current limiting circuit 75 so that the current flowing through the merging point P1 reaches the predetermined current limit value when the motor 20 is rotated. Thus, the change of the current flowing through each phase caused by the temperature change and/or the chronological change is restricted, and therefore, the learning accuracy of the standard position is improved notwithstanding the condition. In the present embodiment, the predetermined current limit value is the first current limit value.

The rotation angle change amount detecting element detects the change amount of the rotation angle of the detent plate 32 based on the counting value of the pulse signal from the encoder 12 regardless of whether the standard position learning control operation is completed or not. Specifically, the rotation angle change amount detecting element detects the change amount of the rotation angle when the detent plate 32 rotates from one rotation position to another rotation position.

Here, a state is defined as the first state such that the current flowing through the windings 22 and the MOS transistors 61-63 are restricted so as to match the current detected by the current detecting circuit 74 to the first current limit value, and the detent plate 32 stops at the limit position of the movable range. Further, a state is defined as the second state such that the current flowing through the windings 22 and the MOS transistors 61-63 are restricted so as to match the current detected by the current detecting circuit 74 to the second current limit value, and the detent plate 32 stops at the limit position of the movable range.

Figure 3:
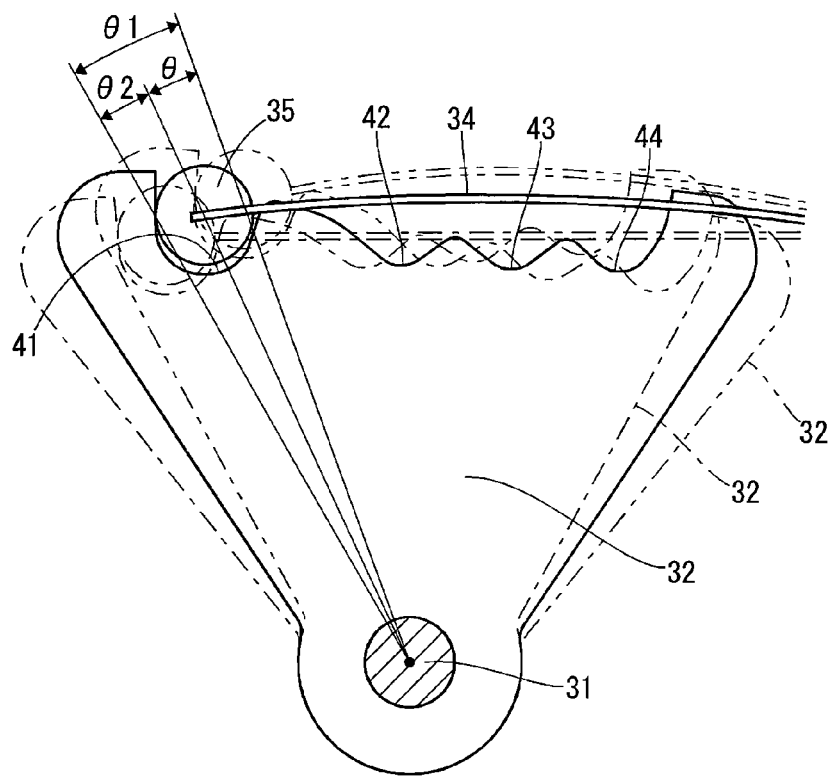
FIG. 3 is a diagram showing a detent plate viewing along a rotational axis when the detent plate is disposed at a standard position, a first state position, and a second state position.
Figure 4:
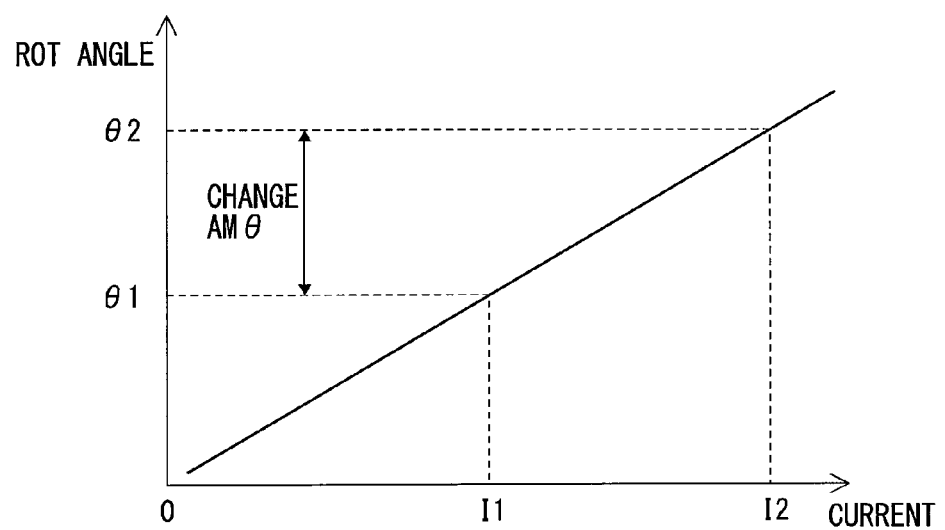
FIG. 4 is a diagram showing a relationship between a current at a position, at which the current flowing through a MOS transistor and the current flowing through the winding merge, and a rotation angle of the detent plate in FIG. 2.

In the present embodiment, the first current limit value is set to be smaller than the second current limit value. Thus, when the current detecting circuit 74 is in a normal operation, as shown in FIG. 3, the torsion amount of the manual shaft 31 and the bending amount of the detent spring 34 in the first state, which are shown as a solid line, are smaller than those in the second state, which are shown as a chain double-dashed line. A state shown as a chain dashed line in FIG. 3 is defined as a not-hitting wall state such that the detent roller 35 is disposed at the center of the concavity 41 of the detent plate 32. The change amount θ2 of the rotation angle of the detent plate 32 when the not-hitting wall state is switched to the second state is larger than the change amount θ1 of the rotation angle of the detent plate 32 when the not-hitting wall state is switched to the first state. Accordingly, the rotation angle of the detent plate 32 when the first state is switched to the second state is changed by the change amount θ, as shown in FIGS. 3 and 4.

In FIG. 1, the error determining element of the MPU 80 controls the detent plate 32 to be in the second state after controlling the detent plate 32 to be in the first state. The error determining element executes a circuit error determining control operation for determining based on the change amount θ of the rotation angle detected by the rotation angle change amount detecting element whether the current detecting circuit 74 is normal or not. Specifically, the error determining element determines that the current detecting circuit 74 is not normal, i.e., the current detecting circuit 74 malfunctions when the change amount θ is outside of the predetermined range. The predetermined range is preliminarily set. When it is determined that the current detecting circuit 74 malfunctions, for example, a warning light of the display device 7 turns on. Thus, the malfunction of the shift-by-wire system 1 is notified to the driver, and the normal driving control operation using the normal driving element is restricted or prohibited.

Next, the control operation of the motor 20 using the MPU 80 will be explained with reference to FIG. 5.

Figure 5:
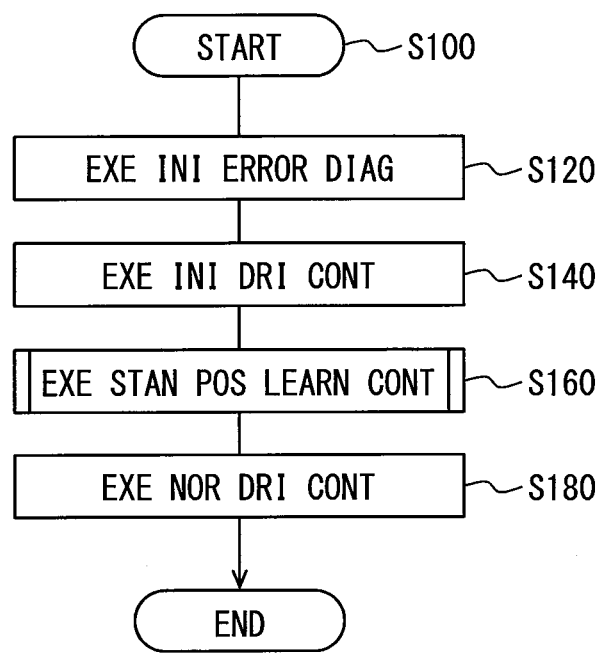
FIG. 5 is a flowchart showing a process relating to a motor control using a MPU of an electronic control unit.

The process S100 shown in FIG. 5 starts when the ignition switch turns on, i.e., the power source of the vehicle turns on so that the shift-by-wire system 1 is activated.

At step S120, the MPU 80 executes the initial error diagnosis. Specifically, the MPU 80 diagnoses whether an error occurs at each part of the shift-by-wire system 1 such as the relay 65. When the error is detected, the error of the shifty-by-wire system 1 is notified to the driver such that the warning light of the display device 7 turns on. After step S120 is completed, it goes to step S140.

At step S140, the MPU 80 executes the initial driving control operation. Thus, the rotation of the actuator 10 (i.e., the motor 20) is appropriately controlled. After step S140, it goes to step S160.

At step S150, the MPU 80 executes the standard position learning control operation. Thus, the limit position of the movable range of the detent plate 32 coincides with the standard position, and therefore, the motor can be operated in the normal driving control operation. Here, the standard position learning control operation will be explained later. After step S160, it goes to step S180.

At step S180, the MPU 80 starts to execute the normal driving control operation. Thus, the shift range of the automatic transmission 3 is switched to a required shift range of the driver.

When the ignition switch turns off, the process ends.

Next, the standard position learning control operation of the MPU 80 will be explained. In the present embodiment, the rotation error determination control operation is executed simultaneously together with the standard position learning control operation.

Figure 6:
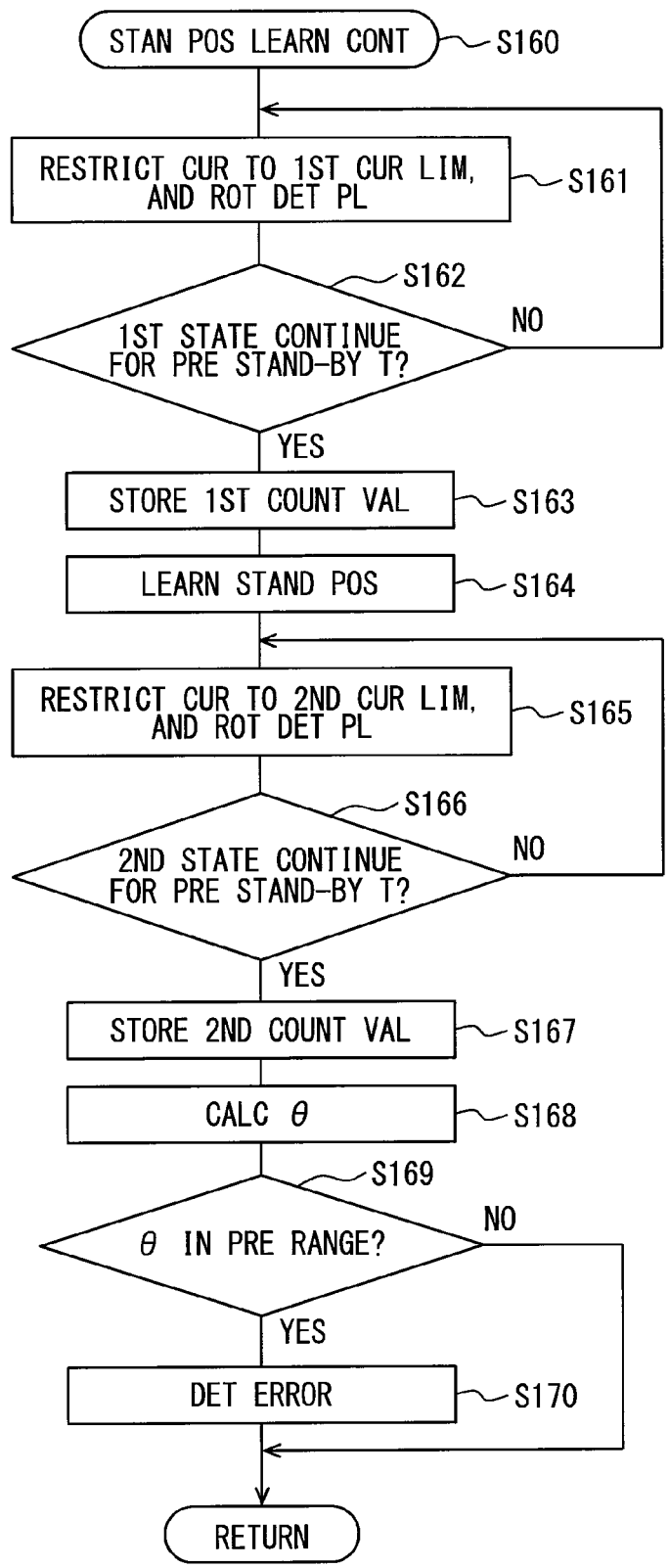
FIG. 6 is a flowchart showing a process relating to a standard position learning control and a circuit error determination control using the MPU of the electronic control unit in FIG. 1.

FIG. 6 shows a sub-flowchart indicative of the process relating to the standard position learning control operation and the rotation error determination control operation. When the process in FIG. 6 starts, at step S161, the MPU 80 restricts the current flowing through the windings 22 and the MOS transistors 61-63 using the current limiting circuit 75 so that the current detected by the current detecting circuit 74 coincides with the first current limit value, and the motor 20 rotates the detent plate 32. After step S161, it goes to step S162.

At step S162, the MPU 80 determines based on the counting value of the pulse signal whether the first state, i.e., the stoppage state of the motor 20, continues for a predetermined stand-by time. When the determination at step S162 is positive, i.e., when the determination at step S162 is "YES," it goes to step S163. When the determination at step S162 is negative, i.e., when the determination at step S162 is "NO," it returns to step S161.

At step S163, the MPU 80 stores the counting value of the pulse signal as the first counting value. After step S163, it goes to step S164.

At step S164, the MPU 80 learns the standard position of the motor 20 based on the first counting value. After step S164, it goes to step S165.

At step S165, the MPU 80 restricts the current flowing through the windings 22 and the MOS transistors 61-63 using the current limiting circuit 75 so that the current detected by the current detecting circuit 74 coincides with the second current limit value. Further, the MPU 80 controls the motor 20 to rotate the detent plate 32. After step S165, it goes to step S166.

At step S166, the MPU 80 determines based on the counting value of the pulse signal whether the second state, i.e., the stoppage state of the motor 20 continues for a predetermined stand-by time. When the determination at step S166 is positive, i.e., when the determination at step S166 is "YES," it goes to step S167. When the determination at step S166 is negative, i.e., when the determination at step S166 is "NO," it returns to step S165.

At step S167, the MPU 80 stores the counting value of the pulse signal as the second counting value. After step S167, it goes to step S168.

At step S168, the MPU 80 calculates the change amount θ of the rotation angle based on the first counting value and the second counting value when the detent plate 32 is changed from the first state to the second state. After step S168. It goes to step S169.

At step S169, the MPOU 80 determines whether the change amount θ calculated at step S168 is within the predetermine range or not. When the determination at step S169 is positive, i.e., when the determination at step S169 is "YES," it goes to step S170. When the determination at step S169 is negative, i.e., when the determination at step S169 is "NO," the process is completed.

At step S170, the MPU 80 determines that the current detecting circuit 74 malfunctions. After step S170, the process ends.

Next, the standard position learning control operation and the circuit error determination control operation executed by the MPU 80 will be explained as follows with reference to FIG. 7.

Figure 7:
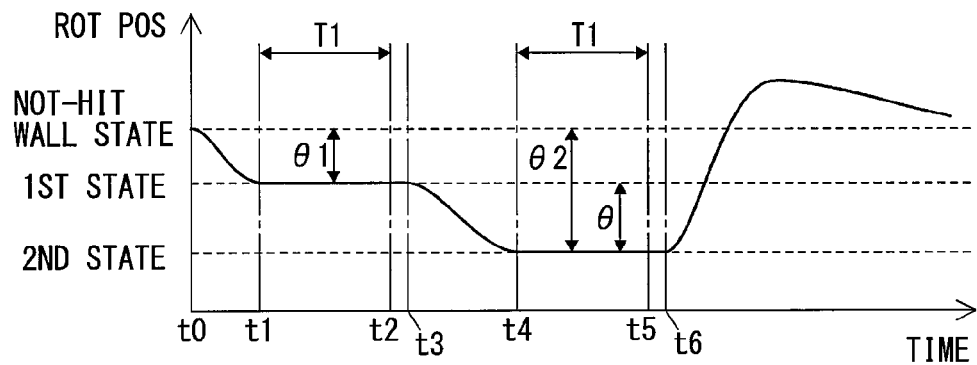
FIG. 7 is a graph explaining a process relating to the standard position learning control and the circuit error determination control using the MPU of the electronic control unit in FIG. 1.

At time t0 in FIG. 7, the MPU 80 starts to execute the standard position learning control operation and the circuit error determination control operation. Just after time t0, the process at step S161 in FIG. 6 is performed, so that the detent plate 32 is rotated. Here, at time t0, the detent plate 32 is in the not-hitting wall state.

At time t1 in FIG. 7, the detent plate 32 is in the first state. At time t2 when the predetermined stand-by time T1 has elapsed since time t1, the determination at step S162 is defined as positive. Just after time t2, steps S163 and S164 in FIG. 6 are performed. Thus, the MPU 80 learns the standard position of the motor 20.

At time t3 in FIG. 7 after learning the standard position, step S165 in FIG. 6 is performed, and the detent plate 32 is rotated.

At time t4 in FIG. 7, the detent plate 32 is in the second state. At time t5 when the predetermined stand-by time T1 has elapsed since time t4, the determination at step S166 is defined as positive. Just after time t5, steps S167 and S168 in FIG. 6 are performed. Thus, the MPU 80 calculates the change amount θ of the rotation angle when the detent plate 32 is changed from the first state to the second state.

After the change amount θ of the rotation angle is calculated, step S169 in FIG. 6 is performed, so that it is determined whether the change amount θ is within the predetermined range. When the change amount θ is not within the predetermined range, i.e., when the change amount θ is out of the predetermined range, it is determined that the current detecting circuit 74 malfunctions. When the change amount θ is within the predetermined range, i.e., when the change amount θ is not out of the predetermined range, it is determined that the current detecting circuit 74 functions properly (i.e., normal).

At time t6 in FIG. 7 when the error determination step is completed, the rotation position of the detent plate 32 is returned to the standard position.

As described above, in the present embodiment, the ECU 60 controls the motor 20 for switching the shift range of the automatic transmission 3 by rotating and driving the detent plate 32. The ECU 60 includes the MOS transistors 61-63, the MPU 80, the MOS driving circuit 72, the current detecting circuit 74 and the current limiting circuit 75.

The MOS transistors 61-63 are arranged to correspond to three phases of the windings 22. When the MOS transistor 61-63 turns on, the corresponding winding 22 is energized. When the MOPS transistor 61-63 turns off, the energization of the corresponding winding 22 is stopped. The MPU 80 and the MOS driving circuit 72 control the MOS transistors 61-63 to turn on and off, so that they controls the driving operation of the motor 20. The current detecting circuit 74 is connected to the merging point P1, at which the current flowing through the windings 22 and the MOS transistors 61-63 is merged. Thus, the circuit 74 detects the current flowing at the merging point P1. The current limiting circuit 75 controls the current flowing through the windings 22 and the MOS transistors 61-63 so that the current detected by the current detecting circuit 74 coincides with one of the first current limit value and the second current limit value selectively.

The MPU 80 includes the standard position learning element, the rotation angle change amount detecting element, and the error detecting element as an ideal function part. The standard position learning element restricts the current flowing through the windings 22 and the MOS transistors 61-3 using the current limiting circuit 75, and rotates the motor 20 until the detent plate 32 stops at the limit position of the movable range. Thus, the learning element learns the standard position of the motor 20. The rotation angle change amount detecting element detects the change amount θ of the rotation angle of the detent plate 32. The error detecting element determines that the current detecting circuit 74 malfunctions when the change amount θ of the rotation angle of the detent plate 32 detected by the rotation angle change amount detecting element is out of the predetermined range in a case where the detent plate 32 is changed from the first state to the second state.

In the above ECU 60, when the MPU 80 learns the standard position of the motor 20, the current limiting circuit 75 restricts the current flowing through the windings 22 and the MOS transistors 61-63 based on the current detected by the current detecting circuit 74, and the motor 20 is rotated and driven. Thus, the change of the current in each phase and the change of the torque of the motor 20 caused by the temperature change and the chronological change are restricted. Accordingly, in the present embodiment, the learning accuracy of the standard position is improved notwithstanding the condition.

In the present embodiment, the torsion amount of the manual shaft 31 and the bending amount of the detent spring 34 in the first state are different from the second state. Thus, the MPU 80 detects the error in the current detecting circuit 74 by utilizing a feature such that the rotation angle of the detent plate 32 is changed when the first state is changed to the second state. Thus, the MPU 80 avoids to learn the standard position under a condition that the current detecting circuit 74 malfunctions. Accordingly, the MPU 80 avoids the malfunction and/or loss of control of the motor 20 caused by an erroneously learned standard position.

In the present embodiment, the standard position learning element of the MPU 80 learns the standard position of the motor 20 when the detent plate 32 is in the first state. Thus, the standard position learning control operation and the circuit error determination control operation are performed at the same time, and therefore, process time for executing the process with the MPU 80 is reduced.

In the present embodiment, the first current limit value is set to be smaller than the second current limit value. Thus, when the torsion amount of the manual shaft 31 and the bending amount of the detent spring 34 are comparatively small, the standard position learning element in the MPU 80 learns the standard position. Accordingly, the accuracy of the learning of the standard position executed by the standard position learning element in the MPU 80 is improved.

In the present embodiment, the shift-by-wire system 1 includes the ECU 60, the motor 20 controlled by the ECU 60, and the detent plate 32 for switching the shift range of the automatic transmission 3 by rotating and driving the motor 20. In the present embodiment, the ECU 60 provides the improvement of the accuracy of learning the standard position notwithstanding the condition such as the temperature change and the chronological change. The system 1 detects the error of the current detecting circuit 74 and the current limiting circuit 75, so that the malfunction of the motor 20 and the loss of control of the motor 20 are avoidable. Thus, the ECU 60 controls the shift-by-wire system 1 effectively.

Other Embodiments

Figure 8:
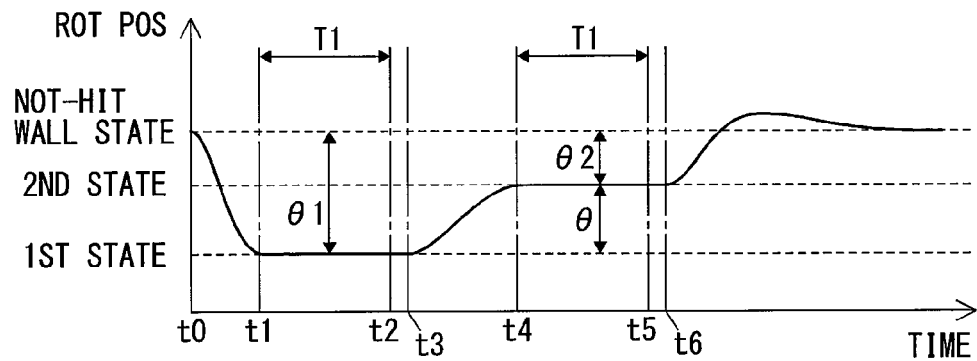
FIG. 8 is a graph explaining a process relating to the standard position learning control and the circuit error determination control using the MPU of the electronic control unit in FIG. 1 according to a first modification of the example embodiment.

In the above embodiment, the first current limit value is set to be smaller than the second current limit value. Thus, as shown in FIG. 7, at first, a comparatively small torque is applied to the detent plate, and the system 1 switches to the first state, in which the rotation angle θ1 is comparatively small from the not-hitting wall state of the detent plate. Then, a comparatively large torque is applied to the detent plate, so that the system 1 switches to the second state, in which the rotation angle θ2 is comparatively large from the not-hitting wall state of the detent plate. In another embodiment, the first current limit value may be set to be larger than the second current limit value. As shown in FIG. 8, at first, the comparatively large torque may be applied to the detent plate, and the system 1 switches to the first state, in which the rotation angle θ1 is comparatively large from the not-hitting wall state of the detent plate. Then, the comparatively small torque is applied to the detent plate, so that the system 1 switches to the second state, in which the rotation angle θ2 is comparatively small from the not-hitting wall state of the detent plate.

Figure 9:
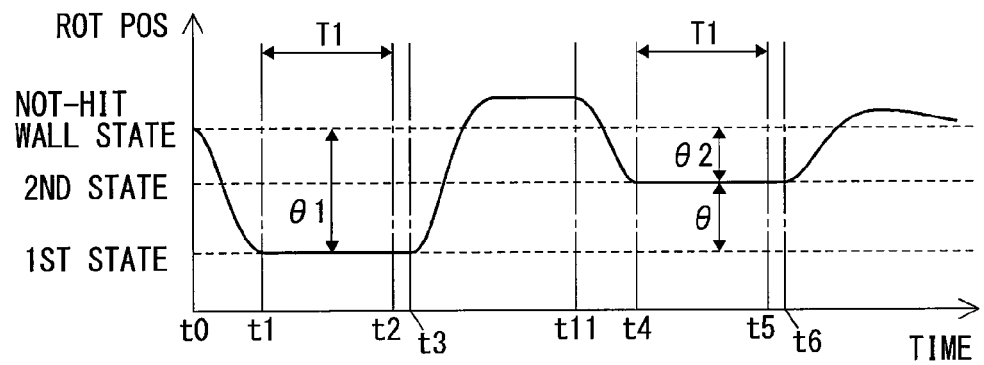
FIG. 9 is a graph explaining a process relating to the standard position learning control and the circuit error determination control using the MPU of the electronic control unit in FIG. 1 according to a second modification of the example embodiment.

In another embodiment, as shown in FIG. 9, the first state is not switched to the second state immediately at time t3, at which the learning of the standard position is completed. Instead, the first state is switched to the not-hitting wall state or around the not-hitting wall state, and then, switched to the second state at time t11. Specifically, in the previous embodiment, the first state is switched to the second state continuously. In another embodiment, the first state may be switched to the second state intermittently.

In another embodiment, the standard position learning element of the MPU may learn the standard position of the motor when the detent plate is in the second state.

In the previous embodiment, the limit position of the movable range is a position corresponding to the P range when the ECU executes the standard position learning control operation. On the other hand, in another embodiment, the limit position of the movable range may be a position corresponding to a range other than the P range when the ECU executes the standard position learning control operation. For example, when multiple concavities of the outer peripheral of the detent plate correspond to the P range, the R range, the N range and the D range in an order along the rotation direction, the limit position of the movable range may be the D range.

In the previous embodiment, when the system 1 executes the standard position learning control operation, the motor is rotated with the two-phase energizing method such that two phases among three phases of the windings 22 are energized, and the energizing phases are switched in turn. On the other hand, in another embodiment, when the system 1 executes the standard position learning control operation, the motor may be rotated with the one-two-phase energizing method such that a one-phase energizing step for energizing one phase of the winding in three phases and a two-phase energizing step for energizing two phases among three phases of the windings are alternately switched.

In another embodiment, the control object may be a motor having four or more windings corresponding to four or more phases. Alternatively, the motor as the control object may be another brushless synchronous motor other than the switched reluctance motor as long as the rotation position of the motor is detected according to the output signal (i.e., the pulse signal) of the encoder, and the energizing phase is switched.

In the previous embodiment, the encoder for detecting the relative rotation position of the motor is a magnetic type encoder. Alternatively, in another embodiment, for example, the encoder may be an optical type or brush type encoder. The encoder outputs the pulse signal in the A phase or the B phase in the previous embodiment. Alternatively, the encoder may output a Z phase signal as an amendment or an index in addition to the pulse signal in the A phase or the B phase.

In another embodiment, the control apparatus may not include the relay for allowing or interrupting the electric power supply to the motor from the power source.

In another embodiment, the number of concavities of the detent plate may be different from four. Specifically, the number of ranges of the automatic transmission may be three or less or five or more.

The shift-by-wire system according to the present disclosure may be applied to a continuously variable transmission (i.e., CVT) for switching the P range, the R range, the N range and the D range, an automatic transmission for a hybrid vehicle, a switching range device having a parking mechanism for switching the P range and the not-P range in an electric vehicle or a hybrid vehicle.

In the previous embodiment, the detent mechanism is provided by multiple concavities formed on the detent plate integrated with the manual shaft and the detent roller. In another embodiment, the detent mechanism including multiple concavities and the detent roller may be arranged near the reducer in the actuator. Alternatively, if the rotation position of the driving object is maintained at a predetermined position, the detent mechanism may be another construction other than the detent mechanism including multiple concavities and the detent roller.

The control apparatus according to the present disclosure may be applied to various switching devices for the synchronous brushless motor as a driving power source in addition to the shift range switching device.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control apparatus that controls a motor, which has a plurality of windings respectively corresponding to a plurality of phases, and is supplied an electric power from a power source so that the motor rotates, for rotating and driving an object, the control apparatus comprising:
a plurality of switching devices, each of which corresponds to one of the plurality of phases, allows energization to a corresponding winding when the switching device turns on, and interrupts the energization to the corresponding winding when the switching device turns off;
a controller that controls the switching devices to turn on and off so that the controller controls an operation of the motor;
a current detecting circuit that detects a current flowing through each winding and each switching device;
a current limit circuit that limits the current flowing through each winding and each switching device to match the current to one of two or more current limiting values;
a standard position learning device that learns a standard position of the motor in such a manner that the current limit circuit limits the current flowing through each winding and each switching device, and the controller controls the motor to rotate until the object stops at a limit position of a movable range;
a rotation angle change amount detecting device that detects a change amount of a rotation angle of the object; and
an error determination device that determines whether the current detecting circuit malfunctions,
wherein a first state is defined as a state that the current limit circuit limits the current flowing through each winding and each switching device to match the current with a first current limit value, and the object stops at the limit position of the movable range,
wherein a second state is defined as a state that the current limit circuit limits the current flowing through each winding and each switching device to match the current to a second current limit value, and the object stops at the limit position of the movable range, and
wherein the error determination device determines that the current detecting circuit malfunctions under a condition that the change amount detected by the rotation angle change amount detecting device is out of a predetermined range when the object changes from one of the first state and the second state to the other of the first state and the second state.

2. The control apparatus according to claim 1, wherein the standard position learning device learns the standard position when the object is in the first state.

3. The control apparatus according to claim 2, wherein the first current limit value is smaller than the second current limit value.

4. A shift-by-wire system comprising:
a control apparatus;
a motor controlled by the control apparatus; and
an object rotated and driven by the motor,
wherein the motor rotates and drives the object to switch a shift range,
wherein the motor has a plurality of windings respectively corresponding to a plurality of phases, and is supplied an electric power from a power source so that the motor rotates,
wherein the control apparatus includes:
a plurality of switching devices, each of which corresponds to one of the plurality of phases, allows energization to a corresponding winding when the switching device turns on, and interrupts the energization to the corresponding winding when the switching device turns off;
a controller that controls the switching devices to turn on and off so that the controller controls an operation of the motor;
a current detecting circuit that detects a current flowing through each winding and each switching device;
a current limit circuit that limits the current flowing through each winding and each switching device to match the current to one of two or more current limiting values;
a standard position learning device that learns a standard position of the motor in such a manner that the current limit circuit limits the current flowing through each winding and each switching device, and the controller controls the motor to rotate until the object stops at a limit position of a movable range;
a rotation angle change amount detecting device that detects a change amount of a rotation angle of the object; and
an error determination device that determines whether the current detecting circuit malfunctions,
wherein a first state is defined as a state that the current limit circuit limits the current flowing through each winding and each switching device to match the current to a first current limit value, and the object stops at the limit position of the movable range,
wherein a second state is defined as a state that the current limit circuit limits the current flowing through each winding and each switching device to match the current to a second current limit value, and the object stops at the limit position of the movable range, and wherein the error determination device determines that the current detecting circuit malfunctions under a condition that the change amount detected by the rotation angle change amount detecting device is out of a predetermined range when the object changes from one of the first state and the second state to the other of the first state and the second state.

5. The shift-by-wire system according to claim 4, wherein the standard position learning device learns the standard position when the object is in the first state.

6. The shift-by-wire system according to claim 5, wherein the first current limit value is smaller than the second current limit value.

* * * * *